United States Patent
Tsuchiya et al.

(10) Patent No.: US 8,277,977 B2
(45) Date of Patent: Oct. 2, 2012

(54) BINDER COMPOSITION, SLURRY FOR ELECTRODES, ELECTRODE AND NONAQUEOUS ELECTROLYTE SECONDARY BATTERY

(75) Inventors: Fumiaki Tsuchiya, Iwata (JP); Yasuhiro Wakizaka, Yokohama (JP)

(73) Assignee: Zeon Corporation, Tokyo (JP)

( * ) Notice: Subject to any disclaimer, the term of this patent is extended or adjusted under 35 U.S.C. 154(b) by 472 days.

(21) Appl. No.: 12/523,241

(22) PCT Filed: Jan. 16, 2008

(86) PCT No.: PCT/JP2008/050419
§ 371 (c)(1),
(2), (4) Date: Oct. 2, 2009

(87) PCT Pub. No.: WO2008/087966
PCT Pub. Date: Jul. 24, 2008

(65) Prior Publication Data
US 2010/0047690 A1    Feb. 25, 2010

(30) Foreign Application Priority Data

Jan. 16, 2007  (JP) .................................. 2007-006536

(51) Int. Cl.
*H01M 4/13*   (2010.01)

(52) U.S. Cl. .................................. 429/217; 429/231.95
(58) Field of Classification Search .................. 429/217, 429/231.95
See application file for complete search history.

(56) References Cited

U.S. PATENT DOCUMENTS 6,743,880 B2 *  6/2004  Holguin ........................ 526/320

FOREIGN PATENT DOCUMENTS

| JP | 11-297329 A | 10/1999 |
| JP | 2002-373701 A | 12/2002 |
| JP | 2003-223895 A | 8/2003 |
| JP | 2005-259512 A | 9/2005 |

* cited by examiner

*Primary Examiner* — Edward Cain
(74) *Attorney, Agent, or Firm* — Birch, Stewart, Kolasch & Birch, LLP

(57) ABSTRACT

The present invention aims at providing slurry for electrodes having advantageous homogeneity and stability, an electrode having advantageous homogeneous thickness and density, and further, a nonaqueous electrolyte secondary battery having small variability in battery properties.

In the present invention, slurry for electrodes is produced by using the binder composition used for manufacturing a nonaqueous electrolyte secondary battery wherein polymers for binding active materials are dissolved or dispersed in organic solvent or water, and a total sum of content ratios of monomer and oligomer is 300 ppm or less.

10 Claims, No Drawings

BINDER COMPOSITION, SLURRY FOR ELECTRODES, ELECTRODE AND NONAQUEOUS ELECTROLYTE SECONDARY BATTERY

TECHNICAL FIELD

The present invention relates to a binder composition which is available to use manufacturing a nonaqueous electrolyte secondary battery such as a lithium ion secondary battery, etc., and a slurry for electrodes. Also, the present invention relates to an electrode having an active material layer formed by using said slurry for electrodes, and a nonaqueous electrolyte secondary battery composed of said electrode.

BACKGROUND ART

Recently, a nonaqueous electrolyte secondary battery, such as a lithium ion secondary battery, has substituted for a conventional secondary battery, such as lead secondary battery, nickel cadmium secondary battery and nickel hydride secondary battery, and plays the principle role in a small secondary battery for electronics due to its high power density.

The nonaqueous electrolyte secondary battery may be used in a single in mobile phone, etc., and in multiply used in laptop computer, automobile, etc. When properties such as charging capacity and discharging capacity between cells are varied in case of using in multiple, and as a result, a part of batteries is subject to large charging load and discharging load, there may arise such problems that dramatically reducing lifetime.

An electrode of nonaqueous electrolyte secondary battery is obtained by pressure treatment after applying a slurry to a collector and drying the slurry, wherein the slurry comprises active material and binding agent, and optionally conductive agent and thickener dispersed and mixed to organic solvent or water (herein after referred as "slurry for electrodes"). When stability of the slurry for electrodes is insufficient, a thickness and a density of electrode becomes ununiformity due to occurrence of aggregation and depression of the active material at the time of preservation and coating. The uniformity of the electrode like this causes variability of properties such as charging capacity and discharging capacity between cells produced by using them.

To solve such a problem, in Patent Document 1, it has been proposed a positive paste (slurry for electrodes) which is kneaded and dispersed by using surface modified conductor with additional a specific dispersing agent. Also, in Patent Document 2, it has been proposed that a producing method for slurry for electrodes comprising preliminarily producing paste by kneading plasticizing agent, active material and conductive agent preliminarily, then, adding binder composition wherein binding agent is dispersed in carrier medium and kneaded further. Although slurry for electrodes having advantageous stability can be obtained by either methods, there was a problem that productivity is reduced due to complicated producing process.

Patent Document 1: Japanese Patent Laid Open No. 2001-23613
Patent Document 2: Japanese Patent Laid Open No. 2000-12001

DISCLOSURE OF INVENTION

Problem to be Solved by the Invention

The present invention intends to provide slurry for electrodes having excellent homogeneity and stability, an electrode having excellent homogeneous thickness and density, and further, a nonaqueous electrolyte secondary battery having small variability in battery properties.

Means for Solving the Problem

The present inventors found, as a result of keen examinations for achieving the above purpose, a monomer and an oligomer in binder composition affect stability of slurry for electrodes as follows.

Namely, in the slurry for electrodes, an active material can be stably dispersed by polymer which adsorbs onto a surface of the active material. However, when the monomer and the oligomer exist in the binder composition, adsorption of the polymer is inhibited due to their adsorption onto the surfaces of active material. Since the active material on which the monomer and the oligomer adsorb, is less dispersion stability as compared from one on which the polymer adsorbs, thus, stability of the slurry for electrodes is reduced.

Then, as a result of further keen examinations, the present inventors found that it is possible to obtain slurry for electrodes having advantageous homogeneous and stability easily by adjusting a sum of contents ratio of the monomer and oligomer in the binder composition to be 300 ppm or less, and came to completing the present invention based on the findings.

According to the first aspect of the present invention, there is provided a binder composition used for producing a nonaqueous electrolyte secondary battery wherein a polymer for binding active materials is dissolved or dispersed in water or organic solvent, and a sum of contents ratio of following (A) or (B) is 300 ppm or less.

(A) a monomer to form repeated structure included in said polymer by polymerization, and (B) an oligomer of reaction product of said monomer having a weight-average molecular weight composed of 3,000 or less.

Wherein, said polymer is dissolved or dispersed in an organic solvent, and its content ratio is preferably 4 to 13 mass %.

A content ratio of said monomer (A) is preferably 50 ppm or less.

A breaking elongation of said polymer is preferably 100 to 3000%.

A breaking strength of said polymer is preferably 2 MPa or more.

A weight-average molecular weight of said polymer is preferably 50,000 to 1,000,000.

According to the second aspect of the present invention, there is provided a slurry for electrodes including said binder composition and an active material.

According to the third aspect of the present invention, there is provided an electrode comprising an active material layer formed by coating and drying said slurry for electrodes and a collector.

According to the fourth aspect of the present invention, there is provided a nonaqueous electrolyte secondary battery comprising an electrode wherein said electrode is at least one of a positive electrode and a negative electrode.

Effects of the Invention

The present invention can provide a slurry for electrodes having advantageous homogeneity and stability, an electrode having advantageous homogeneous thickness and density, and further, a nonaqueous electrolyte secondary battery having small variability in battery properties. The battery provided in the present invention can be preferably used as a small secondary battery for electronics, and a secondary battery for engine for automobile, etc.

BEST MODE FOR WORKING THE INVENTION

Binder Composition

Binder composition of the present invention is composed of polymer for binding active materials being dissolved or dispersed in water or organic solvent.
(Polymer)

A polymer used in the present invention may be a polymer for binding the active materials, acrylic polymer, diene polymer, styrene polymer, olefinic polymer, ether polymer, polyimide polymer, polyester polymer and urethane polymer. Due to having advantage dispersion stability and binding force of the active materials, the acrylic polymer and the diene polymer are preferable, and the acrylic polymer is further preferable.

With a view to attaining good binding property of the active materials and good flexibility of electrode, a breaking elongation of the polymer is preferably 100 to 3000%, and 200 to 2500% is further preferable. Also, a breaking strength of the polymer is preferably 2 MPa or more, and 3 MPa or more is further preferable.

In the present invention, the breaking elongation and the breaking strength are measured by following methods.

A sheet in dimension 10 cm length, 10 cm width and 1 mm thickness is produced by a cast method from binder composition wherein the polymer is dissolved or dispersed in organic solvent or water. When the binder composition is formed by dissolving or dispersing the polymer in water, a cast film is dried with wind, thereby drying 1 hour under 50 kPa and at 120° C. When the binder composition is formed by the polymer dissolved or dispersed in the solvent, the cast film is dried over a period of 17 hours at a temperature capable of volatilizing the solvent by using an inert oven. For example, in case that N-methylpyrrolidone is used as solvent, it is dried at 120° C. Using a test piece punched out from the obtained sheet by a dumbbell No. 2, a pulling test according to JIS K6251 is measured.

The polymer can be used either alone or in combination of 2 or more.

The acrylic polymer is a homopolymer or a copolymer having repeating unit derived from acrylic acid, methacrylic acid or crotonic acid, or their derivatives, or a mixture thereof in a molar ratio of 50 mol % or more in the polymer.

As for acrylic acid derivatives, methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate, lauryl acrylate, acrylic nitrile, polyethylene glycol diacrylate, etc are exemplified. As for the methacrylic acid derivatives, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxypropyl methacrylate, lauryl methacrylate, methacrylic nitrile, glycidyl methacrylate and tetraethyleneglycol dimethacrylate, etc. are exemplified. As for the crotonic acid derivatives, methyl crotonate, ethyl crotonate, propyl crotonate, butyl crotonate, isobutyl crotonate, n-amyl crotonate, isoamyl crotonate, n-hexyl crotonate, 2-ethylhexyl crotonate and hydroxypropyl crotonate, etc. are exemplified.

Specific examples of acrylic copolymer include 2-ethylhexyl-methacrylonitrile-ethylenegricoldimethacrylate acrylic copolymer, 2-ethylhexyl-methacrylonitrile-tetraethylenegricol dimethacrylate acrylic copolymer, 2-ethylhexyl-methacrylonitrile-methoxypolyethyleneglycol-ethylene gricoldimethacrylate acrylic copolymer, butyl-acrylonitrile-diethyleneglycoldimethacrylate acrylic copolymer, 2-ethylhexyl-ethyl acrylate-acrylonitrile-polyethyleneglycoldiacrylate methacrylate copolymer, ethyl-acrylonitrile-itaconic acid acrylate copolymer, etc.

Diene copolymer is a homopolymer or a copolymer having a repeating unit derived from conjugated diene, such as butadiene, isoprene, 1,3-pentadiene or mixture thereof in a molar ratio of 50 mol % or more in polymer.

Specific examples of the diene polymer include polybutadiene, polyisoprene, styrene-butadiene random copolymer, styrene-isoprene random copolymer, acrylonitrile-butadiene copolymer, styrene-acrylonitrile-butadiene copolymer, styrene butadiene block copolymer, styrene-butadiene-styrene block copolymer, styrene-isoprene block copolymer, and styrene-isoprene-styrene block copolymer, etc.

A degree of swelling of polymer in the electrolyte used in the present invention is preferably 2 to 10 times, more preferably 2 to 5 times. When the degree of swelling is within the above mentioned range, a cycle life of a cell is excellent. The degree of swelling shows a mass change ratio (multiple) of polymer when the polymer is immersed in the electrolyte (ethylene carbonate/diethyl carbonate=$\frac{1}{2}$ (mass ratio) 1M solvent of $LiPF_6$) during 72 hrs at 60° C.

Although the polymer used in the present invention is not particularly limited with respect to whether gel exists or not, it is preferable to include the gel due to excellent electrolyte resistance. Content of the gel is preferably 30 mass % or more, 40 mass % or more is more preferable and 50 mass % or more is particularly preferable. In the present invention, the gel means insoluble in tetrahydrofuran, the gel contents shows a ratio of gel in the polymer by mass %.

As for the polymer including the gel, polymers obtained by copolymerizing a monomer having cross-linkable group, or a polyfunctional monomer having two or more functional groups are exemplified.

The cross-linkable group is a group cross-linking by heating or UV irradiation. An initiator or an accelerator may be used for cross-linking. As for the cross-linkable group, epoxy group, hydroxyl group, N-methylolamide group, oxazolyl group are exemplified, epoxy group and hydroxyl group are preferable. A monomer having cross-linkable group can be used either alone or in combination of 2 or more.

As for the acrylic polymer wherein monomer having cross-linkable group are copolymerized, butyl acrylate-2-vinyl acrylate-2-oxazoline copolymer, ethyl acrylate-acrylonitrile-arylglycidyl ether copolymer, butyl acrylate-acrylonitrile-glycidyl methacrylate-methacrylic acid copolymer, ethyl acrylate-2-ethylhexyl acrylate-glycidyl methacrylate-methacrylic acid copolymer are exemplified.

As for the polyfunctional monomer, ethyleneglycol dimethacrylate and divinylbenzene are exemplified. And as for the acrylic copolymer obtained by copolymerizing polyfunctional monomers, for example, 2-ethylhexyl acrylate-acrylonitrile-ethyleneglycol dimethacrylate copolymer, styrene-butadiene-divinylbenzene copolymer, butyl acrylate-acrylonitrile-ethylene dimethacrylate copolymer are exemplified.

A weight-average molecular weight of tetrahydrofuran content soluble or copolymer excluding gel is preferably 5,000 to 5,000,000, 10,000 to 2,000,000 is further preferable and 50,000 to 1,000,000 is particularly preferable. When molecular weight is within this range, dispersibility of active material is excellent and coating capability of slurry for electrodes by using thereof is excellent. The weight-average molecular weight can be measured by gel permeation chromatography (GPC) with a standard polystyrene conversion.

Amount of the polymer in binder composition of the present invention is, when solved or dispersed in an organic solvent, preferably 4 to 13 mass % to said binder composition, 6 to 11 mass % is further preferable and 7 to 10 mass % is particularly preferable. Also, when it is dissolved or dispersed in water, 20 to 60 mass % is preferable, and 30 to 50 mass % is further preferable. When concentration of the polymer is within this range, viscosity of the slurry for electrodes produced by using thereof becomes excellent and the coating capability becomes excellent.

(Water/Organic Solvent)

The binder composition of the present invention is formed by dissolving or dispersing the polymer in the organic solvent or water. When it is used for manufacturing a nonaqueous electrolyte secondary battery such as a lithium ion secondary battery, if water used during manufacturing is mixed into the battery, this causes deterioration of electrolysis solution, and stability is reduced. In view of the above mentioned point, it is preferable to use the organic solvent rather than using water.

As for the water, water treated by ion exchange resin (ion exchanged water) and water (extra pure water) treated by reverse osmosis membrane water purifying system are exemplified.

As for the organic solvent, alicyclic hydrocarbons such as cyclopentane and cyclohexane, etc.; aromatic hydrocarbons such as toluene and xylene, etc.; ketones such as ethylmethylketone and cyclohexanone, etc.; esters such as ethyl acetate, butyl acetate, γ-butyrolactone, and ϵ-caprolactone, etc.; nitrites such as acetonitrile and propionitrile, etc.; ethers such as tetrahydrofuran and ethyleneglycoldiethylether, etc.; alcohols such as methanol, ethanol, isopropanol, ethyleneglycol and ethyleneglycolmonomethylether, etc.; amides such as N-methylpyrrolidone, N,N-dimethylacetamide and N,N-dimethylformamide, etc. are exemplified. These organic solvents can be used either alone or in combination of 2 or more. N-methylpyrrolidone (herein after referred as "NMP") is preferable particularly, because coating properties to a collector and dispersibility of the biding agent is excellent.

(Solution/Dispersion Methods)

A method for dissolving or dispersion of said polymer to said organic solvents or water are not particularly limited. For example, a method by using a dissolving machine such as stirring, shaking and rotary type is exemplified. Also, as dispersion method, a method by using a dispersion mixer such as a homogenizer, a ball-mill, a sand-mill and a planetary kneading machine, etc. is exemplified.

A binder composition of the present invention is characterized by that a total sum of contents of following (A) and (B) is 300 ppm or less.

(A) a monomer for forming a repeating structure included in said polymer by polymerization (herein after referred as merely "monomer").

(B) an oligomer of reaction product of said monomer having a weight-average molecular weight composed of 3,000 or less (herein after referred as merely "oligomer").

(Monomer and Oligomer)

The monomer in the binder composition of the present invention is a monomer remained by non-reaction when producing a polymer (namely, polymerization). Also, the oligomer in the binder composition of the present invention is a by-product at the polymerization of the monomer and having a weight-average molecular weight of 3,000 or less. In the present invention, the weight-average molecular weight of the oligomer is measured by gel permeation chromatography (GPC) with a standard polystyrene conversion.

(Content Ratio of Monomer and Oligomer)

A total sum of content ratio of the monomer and the oligomer in the binder composition of the present invention is 300 ppm or less to said binder composition, 200 ppm or less is preferable and 100 ppm or less is further preferable. When, the content ratio is within the above range, producing slurry for electrodes having excellent homogeneity and stability is available. Upon achieving a purpose of the present invention, although it has been considered that a lower total content ratio of the monomer and the oligomer included in the biding agent composition is preferable, when the total content ratio thereof is excessively lower, it has been found out that lifetime properties of a cell is likely lowered due to Solid Surface-Electrolyte Interface (SEI) is not formed homogenously. Therefore, the total content ratio of the monomer and the oligomer included in the binder composition is preferably 0.1 ppm or more.

In case that surface active agent is included in the binder composition of the present invention, content ratio thereof is preferably 300 ppm or lower to said binder composition. When the content ratio is within the above range, producing slurry for electrodes having further excellent homogeneity and stability becomes available. As for the surface active agent included in the binder composition of the present invention, a surface active agent used for emulsion polymerization of polymer is exemplified. As specific examples of the surface active agents for the emulsion polymerization, alkylarylsulfonate such as sodium dodecylbenzenesulfonate, sodium dodecylphenylethersulfonate; alkyl sulfates such as sodium lauryl sulfate, sodium tetradecylsulfate are exemplified.

A method for producing a binder composition having low total content ratio of the monomer, the oligomer and the surface active agent (herein after referred as "low molecular weight component" as overall of the monomer, the oligomer and the surface active agent, a total sum of content ratio thereof is referred as "low molecular weight component content ratio") is not particularly limited, there are methods that a method for obtaining the low molecular weight component content ratio and using thereof and a method for removing low molecular weight component at a producing stage of the binder composition, etc.

As for methods for obtaining polymer or polymer solvent having low molecular weight component, there are a method for optimizing condition when polymerization and a method for purifying polymer. As specific examples, a method for increasing a polymerization reaction ratio of monomer by optimizing polymerization temperature and polymerization time, a method for reducing side-production amount of the oligomer by optimizing amounts of an initiator and a chain transfer agent, a method for reducing usage of surface active agent by optimizing monomer composition and stirring rate, and a method for purifying polymer by reprecipitation, etc. are exemplified.

As for the removing method for low molecular weight component at the time of producing the binder composition, following methods are exemplified. As a first method is that, for example, when producing the binder composition by using polymer emulsion produced by emulsion polymerization and MNP as an organic solvent (namely, in case that water is displaced to NMP), after mixing said emulsion and huge amount of NMP, removing water and low molecular weight component under reduced pressure. As a second method is that, for example, a method for adjusting concentration by adding huge amount of water to polymer emulsion produced by emulsion polymerization and removing low molecular weight component by steam distillation. As a third method is that, for example, adsorbent such as molecular sieves, etc. is contacted with binder solution to adsorb and remove low molecular weight component. As a fourth method is that a removing method, for example, in case that the binder composition is dissolved or dispersed in solvent such as NMP, the binder composition and water are contacted, extracting the low molecular weight component such as water solvable monomer to water phase, and separating liquid thereafter. These methods can be used either alone or in combination of 2 or more.

Among the above methods, the first method is preferable for efficiently removing the low molecular weight component. A condition for removing the low molecular weight component at this time is, for example, a pressure is less than atmospheric pressure, preferably 95 kPa or less, a temperature is 30 to 150° C., preferably 80 to 120° C. Also, the fourth method is preferable for efficiently removing the surface active agent.

(Measuring Method)

Although, a measuring method for contents ratio of the oligomer and the monomer in the binder composition is not particularly limited, for example, a content ratio of the oligomer may be measured by a gel permeation chromatography (GPC), a content ratio of the monomer may be measured by gas chromatography (GC).

(Slurry for Electrodes)

Slurry for electrodes of the present invention includes the binder composition of the present invention and the active material may be used for any of a positive electrode and a negative electrode.

A method for preparing the slurry for electrodes is not particularly limited, and normally, a method using a mixing machine such as ball mill, a sand mill, a pigment disperser, a grinding and mincing apparatus, an ultrasonic disperser, a homogenizer, a planetary mixer and Hobart mixer may be used. Although a mixing time is not particularly limited, it is preferable to mix until a particle size of agglomerate measured by a gage (fineness gage) in accordance with Japan Industrial Standard JIS K5600-2-5:1999 becomes 100 μm or less. Concentration of the slurry for electrodes is preferably 60% to 90% as a volume percentage of solids contents. When the concentration of the slurry for electrodes is within this range, it is preferable because porosity in the active material layer may be made as smaller.

The pore of the active material layer means void created between the active materials, a porosity ratio can be measured from a difference of a theoretical density determined from a density of material to compose the active material and an experimental density.

Although a dispersion medium used for the slurry for electrodes is not particularly limited, as far as it is a liquid to disperse the active material, for example, the organic solvent and water used for said binder composition are exemplified. The dispersion medium may be an identical or different with that of used for producing the binder composition. Also, the dispersion medium can be used either alone or in combination of 2 or more.

(Active Material)

The active material used in the present invention may be any one capable of reversibly inserting and releasing lithium ion by applying electric potential in the electrolyte, and either inorganic compound or organic compound can be used.

As an active material for the positive electrode, there can be illustrated a lithium-containing composite metal oxide such as $LiCoO_2$, $LiNiO_2$, $LiMnO_2$, $LiMn_2O_4$, $LiFeVO_4$ and $Li_xNi_yCo_zMnO_2$ (where x+y+z+w=2); a lithium-containing composite metal oxoacid salt such as $LiFePO_4$, $LiMnPO_4$ and $LiCoPO_4$; a transition metal sulfide such as $TiS_2$, $TiS_3$ and amorphous $MoS_3$; a transition metal oxide such as $Cu_2V_2O_3$, amorphous $V_2O-P_2O_5$, $MoO_3$, $V_2O_5$ and $V_6O_{13}$; and a compound wherein a part of transition metals in these compounds is substituted by other metals. Further, a conductive polymer such as polyacetylene and poly-p-phenylene can be used. Also, a compound obtained by coating a part of or the entire surface of these compounds with carbon material and inorganic compound, etc. can be used.

Also, as an electrode active material for the negative electrode, for example, there may be mentioned a carbon material such as amorphous carbon, graphite, natural graphite, mesocarbon microbeads (MCMB) and pitch-based carbon fiber, and a conductive polymer such as polyacene. In addition, a metal capable of being alloyed with lithium, such as Si, Sn, Sb, Al, Zn and W, may be mentioned. The electrode active material wherein an electrical conducting material is attached to the surface by mechanical modification method can be used as well.

Among these, because it is easy to obtain high capacity, and is stable at high temperature, and it shows small change in volume as a result of insertion and release of lithium ion and is easy to decrease electrode thickness change ratio, lithium-containing composite metal oxide and lithium-containing composite metal oxoacid salt are preferable as the positive electrode active material, and carbon material is preferable as the negative electrode active material.

The form of particle of the active material is preferably maintained in a spherical shape because the porosity in the active material layer can be made smaller. Also, as regarding the particle size, a mixture of fine particles having a volume-average particle size of 0.8 μm to 2 μm and relatively-large particles having a volume-average particle size of 3 to 8 μm, and particles having a broad particle size distribution in a range of 0.5 to 8 μm are preferable. When including particles with a particle size of 50 μm or more, it is preferable to sift for removing these before use. Further preferably, the tap density of the electrode active material is 2 g/cm$^3$ or more for the positive electrode and 0.8 g/cm$^3$ or more for the negative electrode.

(Electrical Conducting Material)

The slurry for electrodes of the present invention may include an electrical conducting material. As an electrical conducting material, a conductive carbon such as acetylene black, ketjen black, carbon black, graphite, vapor-grown carbon fiber and carbon nanotube can be used. By using the electrical conducting material, electric interengagement between the electrode active materials can be increased, and the discharging rate property can be improved when using in a nonaqueous electrolyte secondary battery. Amount of the electrical conducting material used is normally 0 to 20 parts by mass, preferably 1 to 10 parts by mass per 100 parts by mass of the active material.

(Thickener)

The slurry for electrodes of the present invention may include a thickener other than said polymer. As for the thickener, for example, cellulosic thickener such as carboxymethylcellulose (CMC), and copolymer of ethylene and vinyl alcohol are exemplified. A blending amount of the thickener is preferable 0.5 to 1.5 parts by mass per 100 parts by mass of the active material. When the blending amount of the thickener is within this range, coating capability and adhesiveness with a collector are excellent.

(Electrode)

An electrode of the present invention comprises the active material layer formed from the slurry for electrodes of the present invention is applied on the collector and dried by heating. Although, a method for producing the electrode of the present invention is not particularly limited, for example, a method wherein said slurry for electrodes is applied on at least one surface of a collector, preferably both surfaces, and dried by heating to form the active material layer. A method for applying the slurry for electrodes to the collector is not particularly limited. There may be mentioned doctor blade method, dip method, reverse roll coating method, direct roll coating method, gravure printing method, extrusion method and brush painting, etc. As a drying method, for example, there may be mentioned drying by warm air, hot air, low wet-air, etc., drying in a vacuum, drying by irradiating (far) infrared rays, electron beam, etc. A drying period is normally 5 to 30 min. and a drying temperature is normally 40 to 180° C.

Then, by pressure treatment with using a die press tool and a roll press equipment, etc., it is preferable to lower the porosity of the active material. The preferable range of the porosity is 5% to 15%, more preferably 7% to 13%. Too high porosity causes to deteriorate charging efficiency and discharging efficiency. Too low porosity may cause problems that high volume/capacity is hardly obtained, and that the electrode material mixture is easily peeled to cause defects.

Further, when using curable polymer, it is preferable to cure the polymer.

The thickness of the active material of the electrode of the present invention is normally 5 μm or more and 300 μm or less, preferably 30 μm or more and 250 μm or less.

(Collector)

The collector used in the present invention is not particularly limited as long as it is an electrically conductive and electrochemically resistant material, a metallic material is preferable because it has heat resistance, and for example, iron, copper, aluminum, nickel, stainless steel, titanium, tantalum, gold and platinum are exemplified. Among these, for positive electrode of the nonaqueous electrolyte secondary battery, aluminum is particularly preferable, and for negative electrode, copper is particularly preferable. The shape of the collector is not particularly limited, and the sheeted collector with a thickness of 0.001 to 0.5 mm or so is preferable. It is preferable that the collector is preliminarily roughened before use for improving adhesive strength with the active material layer. A method for roughening includes mechanical method of polishing, electropolishing, chemical polishing, etc. In the mechanical method of polishing, there can be used abrasive cloth paper with abrasive particles fixed thereon, grinding stone, emery buff, wire brush provided with steel wire, etc. Also, to increase the adhesive strength and conductivity of the active material layer, an interlayer may be formed on the surface of the collector.

(Nonaqueous Electrolyte Secondary Battery)

The nonaqueous electrolyte secondary battery of the present invention comprises the electrode of the present invention as at least one of positive electrode or negative electrode. For better exerting effects of the present invention, it is preferable to use for the thicker one of either positive electrode or negative electrode, and it is further preferable to use for both positive electrode and negative electrode.

(Electrolyte)

The electrolyte used in the present invention is not particularly limited, and for example, an electrolyte, wherein a lithium salt is dissolved as a supporting electrolyte in a non-aqueous solvent, can be used. As a lithium salt, for example, there may be mentioned lithium salts such as $LiPF_6$, $LiAsF_6$, $LiBF_4$, $LiSbF_6$, $LiAlCl_4$, $LiClO_4$, $CF_3SO_3Li$, $C_4F_9SO_3L_1$, $CF_3COOLi$, $(CF_3CO)_2NLi$, $(CF_3SO_2)_2NLi$ and $(C_2F_5SO_2)NLi$. Particularly, $LiPF_6$, $LiClO_4$ and $CF_3SO_3Li$, which are easily soluble in a solvent and exhibit a high degree of dissociation, may be preferably used. These can be used either alone or in combination of 2 or more. An amount of the supporting electrolyte is normally 1 mass % or more, preferably 5 mass % or more, and normally 30 mass % or less, preferably 20 mass % or less, per the electrolyte. When the amount of the supporting electrolyte is either too small or too large, ionic conductivity may be lowered, and charging property and discharging property of the battery may be lowered.

The solvent used for the electrolyte is not particularly limited as long as it is a solvent usable for dissolving the supporting electrolyte therein, and normally, alkyl carbonates such as dimethyl carbonate (DMC), ethylene carbonate (EC), diethyl carbonate (DEC), propylene carbonate (PC), butylene carbonate (BC) and methyl ethyl carbonate (MEC); esters such as γ-butyrolactone and methyl formate; ethers such as 1,2-dimethoxyethane and tetrahydrofuran; sulfur-containing compounds such as sulfolane and dimethyl sulfoxide; can be used. Particularly, dimethyl carbonate, ethylene carbonate, propylene carbonate, diethyl carbonate and methyl ethyl carbonate are preferable since they are easy to obtain high ionic conductivity and broad in a range of operating temperature. These can be used either alone or in combination of 2 or more.

As other electrolytes, there may be mentioned gel polymer electrolyte obtained by impregnating a polymer electrolyte such as polyethylene oxide and polyacrylonitrile with an electrolyte, and inorganic solid electrolyte such as LiI and $Li_3N$.

(Separator)

As a separator, publicly-known separators, including polyolefin, such as polyethylene and polypropylene, microporous membrane or nonwoven fabric; porous resin containing inorganic ceramic powder; etc., can be used.

(Production Method of Battery)

A production method of the nonaqueous electrolyte secondary battery of the present invention is not particularly limited. For example, it can be obtained by superimposing the positive electrode and negative electrode via the separator, winding or bending it in conformity with the battery shape to fit in the battery case, filling the electrolyte in the battery case, and sealing the case. In addition, if needed, an expanded metal, an overcurrent prevention element such as fuse and PTC element, lead board, etc. may be set in to prevent pressure increase in the battery and excess discharge and charge. The shape of the battery may include coin shape, button shape, sheet shape, cylinder shape, square shape and flattened shape.

EXAMPLES

Hereinafter, the present invention will be described based on examples, but the present invention is not limited to these. Note that "part" and % are, unless otherwise particularly noted, mass standard in the present examples.

Experiments in Examples and Comparative Examples are operated according to the following method.

(Evaluation Method)
(1) Weight-Average Molecular Weight of Polymer in Binder Composition A weight-average molecular weight of polymer in a binder composition was calculated by using preformed analytical curve from a peak position measured by gel permeation chromatography (GPC) of the binder composition diluted with tetrahydrofuran three times in a volume ratio. Note that, the weight-average molecular weight is a standard polystyrene equivalent.

(2) Content Ratio of Monomer

Content ratio of monomer was calculated by using preformed analytical curve from a peak area measured by gas chromatography (GC) of the binder composition diluted with NMP nine times in a weight ratio.

(3) Content Ratio of Oligomer

Content ratio of oligomer was calculated by using preformed analytical curve from a peak area measured by gel permeation chromatography (GPC) of the binder composition diluted with tetrahydrofuran three times in a volume ratio. Note that, the weight-average molecular weight is a standard polystyrene equivalent.

(4) Stability of Slurry for electrodes

Stability of slurry for electrodes was evaluated by following method. Sampling slurry for electrodes 30 cc into a cylindrical shape glass bottle having an inner diameter 15 mm, after standing at a room temperature, presence or absence of precipitates was confirmed by visual inspection after 24 hrs and 72 hrs. The stability was determined by following criteria. Here, the stability is excellent as the longer days until precipitation.

A: precipitates were not confirmed after 72 hrs

B: precipitates were not confirmed after 24 hrs, confirmed after 72 hrs.

C: precipitates were confirmed after 24 hrs.

(5) Accuracy of Thickness of Electrode

An accuracy of thickness of electrode was evaluated by surface roughness. An electrode was cut up as a strip in a dimension with 10 mm×50 mm, and five sheets of strip of samples were produced. The measurement was operated by a stylus type surface roughness measuring device in accordance with Japan Industrial Standard JIS B0651:2001 (stylus tip radius=0.5 µm). In accordance with Japan Industrial Standard JIS B0601:2001, from the obtained profile curve, arithmetic average roughness Ra was measured. The measurement was made by the five strip specimens, calculating average value, the variability was determined by following criteria. Smaller values show smoothness of electrode surface.

A+: <0.10 µm
A: 0.10 to 0.50 µm
A−: 0.50 to 1.00 µm
B: 1.00 to 3.00 µm
C: >3.00 µm (6) Variability of Electrode Density A variability of electrode density was evaluated by a following method. An electrode was punched out like a disc shape having 30 mm diameter as a sample. Masses and thicknesses of 50 numbers of samples were measured and their densities were calculated except for collectors. Their standard deviations ($\sigma_{n-1}$) were calculated, and the variability was determined by following criteria. Smaller values show electrode structure is homogeneous structure.

A+: <0.005
A: 0.005 to 0.01
A−: 0.01 to 0.05
B: 0.05 to 0.1
C: >0.1

(7) Variability of Battery Property

50 Battery cells were charged at a temperature of 20° C. with constant current at 0.1 C until 4.3V and then, the battery cells were discharged with constant current 0.1 C until 3.0V. The charge and discharge is defined as 1 cycle, 100 cycles charge and discharge were repeated. A discharging capacity at 100th cycle was measured, its standard deviation ($\sigma_{n-1}$) was calculated, and the variability was determined by following criteria. Smaller values show small variability of property of produced battery.

A+: <0.5
A: 0.5 to 1.0
A−: 1.0 to 2.0
B: 2.0 to 5.0
C: >5.0

(Production Example of Negative Electrode)

500 parts of Mesocarbon microbeads (MCMB: produced by Osaka Gas Chemicals Co., Ltd., Grade 10·28, particle diameter $(D50)_9$ to 15 µm) and 125 parts of 12% NMP solution liquid of polyvinylidene fluoride (PVDF: produced by KUREHA CORPORATION, KF1300) were introduced into a planetary mixer. After adjusting solid content concentration to be 70.5 by adding NMP, and blended during 60 min at 60 rpm. Next, after adjusting solid content concentration to be 63.5% by adding NMP with mixing, defoaming treatment was made under reduced pressure and slurry for negative electrode having shiny appearance and excellent flow property was obtained. The slurry for negative electrode was applied by a comma coater on both sides of copper foil with a thickness of 18 µm so as to have dry thickness of about 100 µm or so, dried at 60° C. for 20 min so that an original electrode plate was obtained. The original electrode plate was rolled by a roll press so that a negative electrode having thickness 170 µm was obtained.

Example 1

To a reactor, 300 parts of ion-exchange water, 50 parts of ethyl acrylate, 40 parts of 2-ethylhexyl acrylate, 8 parts of glycidylmethacrylate, 2 parts of methacrylic acid, 2 parts of sodium dodecylbenzenesulfonate and 1.0 part of potassium persulfate were added, sufficiently mixed, and then, polymerized by heating up to 70° C., so that polymer water dispersion liquid "a" (20% solid content concentration) was obtained. Non reacted monomer was removed by extraction with adding 10 times amount of ethyl acetate, 3 times amount of water to the solid content of the polymer water dispersion liquid "a" and thereby separating. To the remaining polymer, 10 times amount of NMP was added and depressed by a vacuum pump with stirring said mixed solution, and removing water at 80° C., binder composition (dispersion liquid of NMP of polymer, 10% solid content concentration) was obtained. Results of measurement of content ratio of the monomer and oligomer are shown in Table 1. A weight-average molecular weight of the polymer in the obtained binder composition was 350,000.

20 parts of acetylene black (powder of "denkablack" manufactured by Denki Kagaku Kogyo Kabushiki Kaisha) and 1,000 parts of $LiCoO_2$ (average particle size of 3.8 µm and tap density of 2.7 $g/cm^3$) were added to a planetary mixer. 133 parts of mass % NMP solution of the binder composition and NMP were further added so as to control the solid content concentration to 81%, followed by mixing at 60 rpm for 60 minutes. Then, NMP was added to have the solid content concentration of 77%, followed by defoaming treatment under reduced pressure, to obtain a shiny electrode material mixture slurry having a high fluidity. The evaluation results of the stability of the slurry for electrodes are shown in Table 1.

TABLE 1

|  | Example 1 | Example 2 | Example 3 | Example 4 | Comparative Example 1 | Comparative Example 2 |
|---|---|---|---|---|---|---|
| Monomer Content Ratio (ppm) | 10 | 10 | 30 | 40 | 140 | 180 |
| Oligomer Content Ratio (ppm) | 80 | 120 | 130 | 180 | 260 | 320 |
| Stability of Slurry for electrodes | A | A | B | B | C | C |
| Surface Roughness of Electrode | A+ | A+ | A− | A− | C | B |
| Variability of Electrode Density | A+ | A | A | B | B | C |
| Variability of Electrode Property | A+ | A+ | A | A | C | C |

The electrode material mixture slurry was applied by a comma coater on both sides of aluminum foil with a thickness of 20 µm so as to have dry thickness of about 110 µm or so, dried at 120° C., and pressed by a roll press so that the density of the binder composition was $3.6 \times 10^3$ kg/m$^3$. Then, the binder composition was subject to drying treatment at 60° C. for 17 hours under 760 mmHg to obtain positive electrode having thickness 190 µm. Evaluation results of surface roughness and variability of the electrode density are shown in Table 1.

The obtained positive electrode was cut up in a dimension with a width of 54 mm×a length of 480 mm, only the electrode layer on one surface was removed up to 10 mm from an end in a lengthy direction to expose the collector. Also, the obtained negative electrode was cut up in a dimension with a width of 56 mm×a length of 510 mm, as similar with the positive electrode, only one surface of the collector was exposed with 10 mm width.

Subsequently, using the above positive electrode and negative electrode, so that unexposed faces of collectors of the both electrodes are facing, and sandwiching separator by providing portions exposed the collectors are reverse side in the lengthy direction, further, the separators were laminated on the active material layer of the face where the collector of the negative electrode is exposed. Note that, as for the separator, a porosity polyethylene sheet with a thickness of 20 µm was used.

This was helically wound on a collecting rod made from aluminum with 3 mm diameter starting at the collector exposure face of the positive electrode, an electrode multilayer body was obtained wherein the most outer face is the negative electrode. The electrode multilayer body was installed in a stainless steel cylindrical battery case, which had a base and a dimension with a external diameter of 18 mm and height of 67 mm, then, a positive electrode lead and a negative electrode lead were welded. Then, electrode tabs were connected and deaerated, after an electrolyte was injected thereto, a sealing plate was placed, so that a cylindrical lithium ion secondary battery was produced. Note that the electrolyte was obtained by dissolving LiPF$_6$ in a concentration of 1 mol/L in a mixed solvent of ethylene carbonate (EC) and diethyl carbonate (DEC) in a volume ratio of EC:DEC=1:2 (volumes at 20° C.). Evaluation results of variability of the battery property are shown in Table 1.

Example 2

To a reactor, 300 parts of ion-exchange water, 72 parts of ethyl acrylate, 25 parts of acrylonitrile, 3 parts of itaconic acid, 2 parts of sodium dodecylbenzenesulfonate and 1.0 part of potassium persulfate were added, sufficiently mixed, and then, polymerized by heating up to 70° C., so that polymer water dispersion liquid "b" (20% solid content concentration) was obtained. Non reacted monomer was removed by extraction with adding 8 times amount of ethyl acetate, 2 times amount of water to the solid content of the polymer water dispersion liquid "b" and thereby separating. To the remaining polymer, 10 times amount of NMP was added and depressed by a vacuum pump with stirring said mixed solution, and removing water at 80° C., binder composition (dispersion liquid of NMP of polymer, 10% solid content concentration) was obtained. Results of measurement of content ratio of the monomer and oligomer are shown in Table 1. A weight-average molecular weight of the polymer in the obtained binder composition was 280,000. Except for using this binder composition, slurry for electrodes, a positive electrode and a lithium ion secondary battery were obtained in the same way as in Example 1. Evaluation results of stability of slurry for electrode, surface roughness of electrode, variability of electrode density and variability of battery property are shown in Table 1.

Example 3

To a reactor, 300 parts of ion-exchange water, 65 parts of butyl acrylate, 30 parts of acrylonitrile, 5 parts of ethylene dimethacrylate, 2 parts of sodium dodecylbenzenesulfonate and 1.0 part of potassium persulfate were added, sufficiently mixed, and then, polymerized by heating up to 70° C., so that polymer water dispersion liquid "c" (20% solid content concentration) was obtained. To the solid content of polymer water dispersion liquid "c", 18 times amount of NMP was added and depressed by a vacuum pump with stirring said mixed solution, and removing water by heating at 80° C., binder composition (10% solid content concentration), wherein a content ratio of low molecular weight component is decreased, was obtained. Results of measurement of content ratio of the monomer and oligomer are shown in Table 1. A weight-average molecular weight of the polymer in the obtained binder composition was 530,000. Except for using this binder composition, slurry for electrodes, a positive electrode and lithium ion secondary battery were obtained in the same way as in Example 1. Evaluation results of stability of slurry for electrode, surface roughness of electrode, variability of electrode density and variability of battery property are shown in Table 1.

Example 4

To the solid content of polymer water dispersion liquid "a", 18 times amount of NMP is added and depressed by a vacuum pump with stirring said mixed solution, and removing water by heating at 80° C., binder composition (10% solid content concentration) was obtained. Results of measurement of content ratio of the monomer and oligomer are shown in Table 1. A weight-average molecular weight of the polymer in the obtained binder composition was 350,000. Except for using this binder composition, slurry for electrodes, a positive electrode and lithium ion secondary battery were obtained in the same way as in Example 1. Evaluation results of stability of slurry for electrode, surface roughness of electrode, variability of electrode density and variability of battery property are shown in Table 1.

Comparative Example 1

Polymer particles were enlarged by cooling the polymer water dispersion liquid "a" to −20° C. and freezing. Then, the temperature was elevated to the ordinary temperature and water was removed. Thereafter, polymer particles were recovered by sieving. The recovered polymer particles were washed by massive water at 3 times, after dried at 120° C. for 5 hours, and dissolved in NMP, binder composition (10% solid content concentration) was obtained. Results of measurement of content ratio of the monomer and oligomer are shown in Table 1. A weight-average molecular weight of the polymer in the obtained binder composition was 350,000. Except for using this binder composition, slurry for electrodes, a positive electrode and lithium ion secondary battery were obtained in the same way as in Example 1. Evaluation results of stability of slurry for electrode, surface roughness of electrode, variability of electrode density and variability of battery property are shown in Table 1.

Comparative Example 2

Except for using the polymer water dispersion liquid "b" instead of the polymer water dispersion liquid "a", binder composition (10% solid content concentration) was obtained in the same way as in Comparative Example 1. Results of measurement of content ratio of the monomer and oligomer are shown in Table 1. A weight-average molecular weight of the polymer in the obtained binder composition was 280,000. Except for using this binder composition, slurry for electrodes, a positive electrode and lithium ion secondary battery were obtained in the same way as in Example 1. Evaluation results of stability of slurry for electrode, surface roughness of electrode, variability of electrode density and variability of battery property are shown in Table 1.

As shown in Table 1, the binder compositions of the present invention have excellent stability, and electrodes produced by using this show small variability in film thickness and density. Further, the lithium ion secondary battery comprising the electrode shows small variability in battery property which is excellent result. Contrary to this, precipitation of the binder compositions of Comparative Examples 1 to 2 is fast, and electrodes and batteries produced by using them show inferior results.

The invention claimed is:

1. A slurry for electrodes comprising,
  a binder composition and active materials capable of reversibly inserting and releasing lithium ion by applying electric potential in an electrolyte, said binder composition comprises a polymer for binding active materials that is dissolved or dispersed in water or organic solvent, and
  a sum of contents ratio of following (A) or (B) is 300 ppm or less,
  (A) a monomer to form repeated structure included in said polymer by polymerization,
  (B) an oligomer of reaction product of said monomer having a weight-average molecular weight 3,000 or less.

2. The slurry as set forth in claim 1, wherein said polymer in the binder composition is dissolved or dispersed in an organic solvent, and its content ratio is 4 to 13 mass %.

3. The slurry as set forth in claim 1, wherein said polymer in the binder composition has a content ratio of said monomer (A) of 50 ppm or less.

4. The slurry as set forth in claim 1, wherein said polymer in the binder composition has a breaking elongation of said polymer of 100 to 3000%.

5. The slurry as set forth in claim 1, wherein said polymer in the binder composition has a breaking strength of said polymer of 2 MPa or more.

6. The slurry as set forth in claim 1, wherein said polymer in the binder composition is acrylic polymer.

7. The slurry as set forth in claim 1, wherein said polymer in the binder composition has a weight-average molecular weight of said polymer is 50,000 to 1,000,000.

8. An electrode comprising a collector and an active material layer formed by coating and drying a slurry for electrodes, said slurry comprises a binder composition and active materials capable of reversibly inserting and releasing lithium ion by applying electric potential in an electrolyte, wherein the binder composition comprises a polymer for binding active materials that is dissolved or dispersed in water or organic solvent, and
  a sum of contents ratio of following (A) or (B) is 300 ppm or less,
  (A) a monomer to form repeated structure included in said polymer by polymerization,
  (B) an oligomer of reaction product of said monomer having a weight-average molecular weight of 3,000 or less.

9. A nonaqueous electrolyte secondary battery comprising an electrode wherein said electrode of claim 8 is at least one of a positive electrode and a negative electrode.

10. An electrode comprising an active material layer formed by coating and drying a slurry for electrodes and a collector, wherein the slurry for electrodes comprises a binder composition and active materials, and the binder composition comprises a polymer for binding active materials that is dissolved or dispersed in water or organic solvent, and
  a sum of contents ratio of following (A) or (B) is 300 ppm or less,
  (A) a monomer to form repeated structure included in said polymer by polymerization,
  (B) an oligomer of reaction product of said monomer having a weight-average molecular weight 3,000 or less.

* * * * *